United States Patent
Ghosh et al.

(10) Patent No.: US 11,349,557 B2
(45) Date of Patent: May 31, 2022

(54) SYSTEM MODEL AND ARCHITECTURE FOR MOBILE INTEGRATED ACCESS AND BACKHAUL IN ADVANCED NETWORKS

(71) Applicant: AT&T Intellectual Property I, L.P., Atlanta, GA (US)

(72) Inventors: Arunabha Ghosh, Austin, TX (US); Milap Majmundar, Austin, TX (US); Thomas Novlan, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3 days.

(21) Appl. No.: 16/370,229

(22) Filed: Mar. 29, 2019

(65) Prior Publication Data

US 2020/0177271 A1 Jun. 4, 2020

Related U.S. Application Data

(60) Provisional application No. 62/773,881, filed on Nov. 30, 2018.

(51) Int. Cl.
*H04B 7/155* (2006.01)
*H04W 72/04* (2009.01)
(Continued)

(52) U.S. Cl.
CPC ..... *H04B 7/15592* (2013.01); *H04B 7/15557* (2013.01); *H04W 72/0406* (2013.01);
(Continued)

(58) Field of Classification Search
CPC .......... H04B 7/15592; H04B 7/15557; H04W 72/0406; H04W 80/08
See application file for complete search history.

(56) References Cited

U.S. PATENT DOCUMENTS

| 6,879,820 B2 | 4/2005 | Bjelland et al. |
| 6,985,968 B1 | 1/2006 | Gammenthaler |

(Continued)

FOREIGN PATENT DOCUMENTS

| EP | 1973354 A2 | 5/2003 |
| EP | 2922347 A1 | 8/2013 |

(Continued)

OTHER PUBLICATIONS

"Study on Integrated Access and Backhaul for NR", RP-170821, AT&T, Qualcomm, Samsung, 8881123GPP TSG RAN Meeting #75, Dubrovnik, Croatia, Mar. 6-9, 2017, 5 pages.

(Continued)

*Primary Examiner* — Kevin M Cunningham
(74) *Attorney, Agent, or Firm* — Amin, Turocy & Watson, LLP

(57) ABSTRACT

Facilitating operation and support of mobile relays based on an integrated access and backhaul concept for advanced networks (e.g., 4G, 5G, 6G, and beyond) is provided. An embodiment relates to a communication network architecture that can comprise a control plane architecture of a relay node device. The control plane architecture can comprise a star-type architecture. Further, the communication network architecture can comprise a user plane architecture of the relay node device. The user plane architecture can be separated from (or independent of) the control plane architecture. Further, the user plane architecture can comprise a multi-hop architecture. The relay node device can be configured to operate according to a fifth generation wireless network communication protocol, or other advanced communication protocols.

20 Claims, 10 Drawing Sheets

(51) Int. Cl.
  *H04W 80/08* (2009.01)
  *H04W 88/18* (2009.01)
  *H04B 7/0413* (2017.01)
(52) U.S. Cl.
  CPC ........... *H04W 80/08* (2013.01); *H04W 88/18* (2013.01); *H04B 7/0413* (2013.01)

(56) References Cited

U.S. PATENT DOCUMENTS

| | | | |
|---|---|---|---|
| 7,415,627 | B1 | 8/2008 | Radhakrishnan et al. |
| 7,606,140 | B2 | 10/2009 | Golla |
| 8,867,507 | B2 | 10/2014 | Karunakaran et al. |
| 8,971,334 | B2 | 3/2015 | Yedavalli et al. |
| 8,976,673 | B2 | 3/2015 | Yedavalli et al. |
| 9,014,181 | B2 | 4/2015 | Lakshman et al. |
| 9,769,089 | B2 | 9/2017 | Tan et al. |
| 10,033,585 | B2 | 7/2018 | Vohra et al. |
| 2005/0204053 | A1* | 9/2005 | Sheehan ............... H04L 67/10 709/231 |
| 2006/0114826 | A1* | 6/2006 | Brommer ............. H04W 74/06 370/230 |
| 2009/0144442 | A1 | 6/2009 | Zheng et al. |
| 2010/0103845 | A1 | 4/2010 | Ulupinar et al. |
| 2013/0010702 | A1* | 1/2013 | Aminaka ............. H04W 76/15 370/328 |
| 2013/0040558 | A1* | 2/2013 | Kazmi ................. H04W 16/26 455/9 |
| 2016/0044639 | A1* | 2/2016 | Yl ......................... H04L 47/624 370/329 |
| 2016/0344641 | A1 | 11/2016 | Javidi et al. |
| 2017/0105162 | A1* | 4/2017 | Kim ................... H04W 72/042 |
| 2018/0092139 | A1 | 3/2018 | Novlan et al. |
| 2018/0102883 | A1* | 4/2018 | Amini ................. H04B 17/345 |
| 2018/0316521 | A1 | 11/2018 | Liebsch |
| 2019/0159277 | A1* | 5/2019 | Zhu ...................... H04W 92/12 |
| 2020/0084819 | A1* | 3/2020 | Abedini ............. H04B 7/15528 |

FOREIGN PATENT DOCUMENTS

| | | |
|---|---|---|
| WO | 2014111748 A2 | 7/2014 |
| WO | 2017125179 A1 | 7/2017 |
| WO | 2018036922 A1 | 3/2018 |
| WO | 2018175817 A1 | 9/2018 |
| WO | 2018182684 A1 | 10/2018 |

OTHER PUBLICATIONS

International Search Report and Written Opinion received for PCT Application Serial No. PCT/US2019/058986 dated Jan. 15, 2020, 16 pages.
KDDI Corporation, "NSA relay architecture", 3GPP TSG-RAN WG2 NR Ad hoc 1801, R2-1800571, Vancouver, Canada, Jan. 22-26, 2018, pp. 1-3.
3GPP, "3rd Generation Partnership Project; Technical Specification Group Radio Access Network; Study on Integrated Access and Backhaul", Release 15, 3GPP TR 38.874 0.7.0, Nov. 2018, pp. 1-111.
AT&T, "Motivation for Integrated Access and Backhaul WI", RAN#80, La Jolla, USA, Jun. 11-14, 2018, AI 9.4.5, RP-180789, pp. 1-9.
RP-170821, Study on Integrated Access and Backhaul for NR, AT&T, Qualcomm, Samsung.
Weiler, Richard J., et al. "Enabling 5G backhaul and access with millimeterwaves." Networks and Communications (EuCNC), 2014 European Conference, IEEE, 2014.
Agyapong, Patrick Kwadwo, et al. "Design considerations for a 5G network architecture." IEEE Communications Magazine 52.11 (2014): 65-75.
Saha, Rony Kumer, Yan Zhao, and Chaodit Aswakul. "A Novel Approach for Centralized 3D Radio Resource Allocation and Scheduling in Dense HetNets for 5G Control-/User-plane Separation Architectures." Engineering Journal 21.4 (2017): 287-305.
Saha, Rony Kumer, and Chaodit Aswakul. "Incentive and architecture of multiband enabled small cell and UE for up-/down-link and control-/user-plane splitting for 5G mobile networks." Frequenz 71.1-2 (2017): 95-118.
International Preliminary Report on Patentability received for PCT application No. PCT/US2019/058986 dated Jun. 10, 2021, 9 pages.

* cited by examiner

SYSTEM MODEL AND ARCHITECTURE FOR MOBILE INTEGRATED ACCESS AND BACKHAUL IN ADVANCED NETWORKS

CROSS-REFERENCE TO RELATED APPLICATIONS

This application claims the benefit of U.S. Provisional Application Ser. No. 62/773,881, filed Nov. 30, 2018, and entitled "SYSTEM MODEL AND ARCHITECTURE FOR MOBILE INTEGRATED ACCESS AND BACKHAUL," the entirety of which is expressly incorporated herein by reference.

TECHNICAL FIELD

This disclosure relates generally to the field of mobile communication and, more specifically, to a system and architecture to support mobile relays based on an integrated access and backhaul concept for advanced networks (e.g., 4G, 5G, 6G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or a Sixth Generation (6G) standard for wireless communications. Unique challenges exist to provide levels of service associated with forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
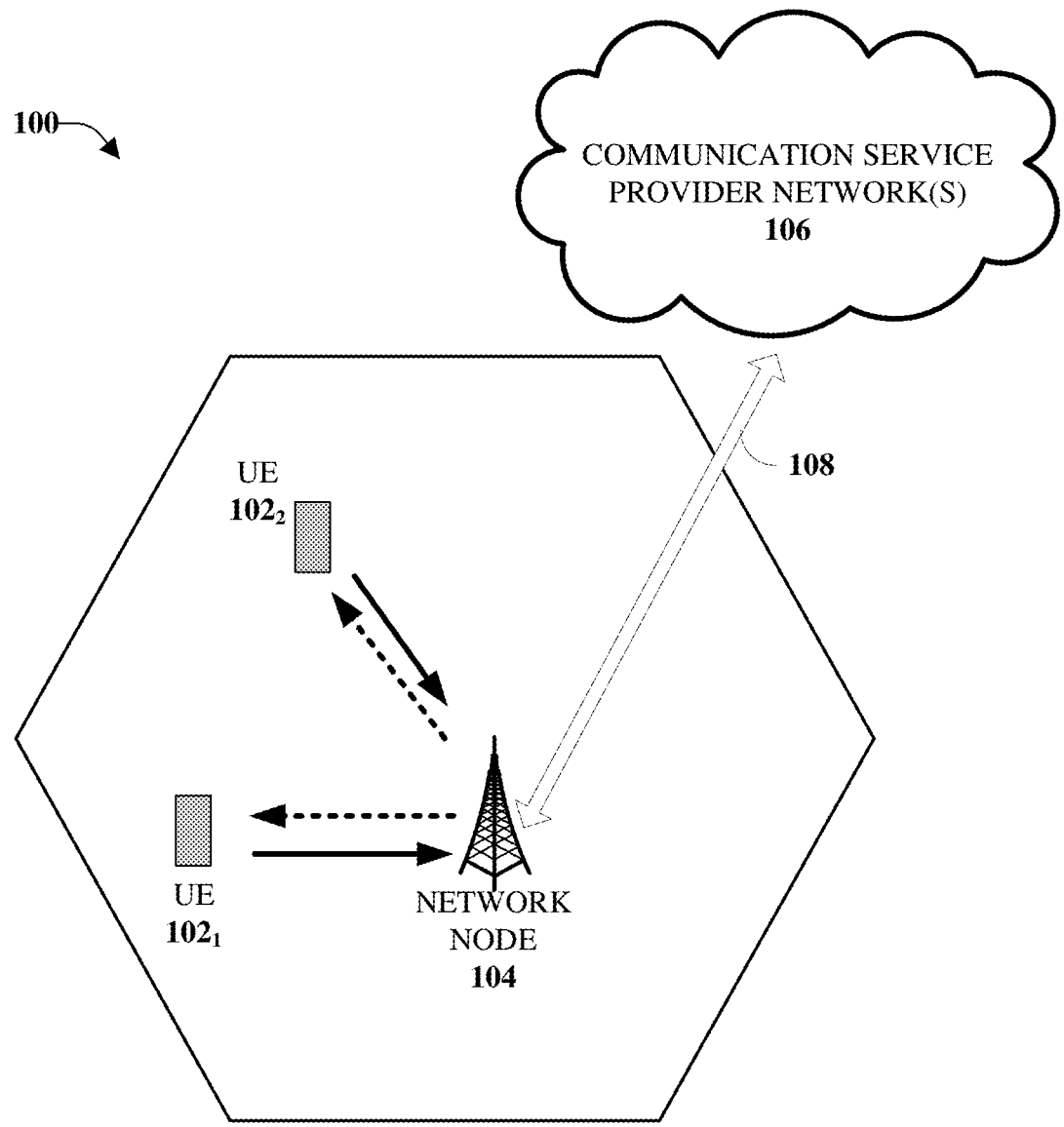
FIG. 1 illustrates an example, non-limiting, wireless communication system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate a system model and architecture for mobile Integrated Access and Backhaul (IAB) for advanced networks. More specifically described herein are aspects related to wireless communication systems and related to a system and architecture to support mobile relays based on the IAB (Integrated Access and Backhaul) concept for advanced networks.

Due to the expected larger bandwidth available for New Radio (NR) compared to Long Term Evolution (LTE) (e.g. mmWave spectrum) along with the native deployment of massive Multiple Input Multiple Output (MIMO) or multi-beam systems in NR, an opportunity to develop and deploy integrated access and backhaul links is available. This can allow easier deployment of a dense network of self-back-hauled NR cells in a more integrated manner by building upon many of the control and data channels/procedures defined for providing access to User Equipment (UE) devices.

Described herein are systems, methods, articles of manufacture, and other embodiments or implementations that can facilitate a system model and architecture for mobile integrated access and backhaul in advanced networks. The disclosed aspects provide a solution and an architecture to support mobile relay for a multi-hop IAB network. Current IAB solutions from 3GPP cannot support full mobility of the relay nodes. However, the disclosed aspects provide a solution that supports a new architecture where the control plane and user plane have very different topographical architectures.

An embodiment relates to a method that can comprise facilitating, by a first relay node device comprising a processor, a first connection to a donor node device. The first connection can be configured for a master cell group. The method can also comprise facilitating, by the first relay node device, a second connection to a second relay node device. The second connection can be configured for a secondary cell group. The first connection and the second connection can be separate connections.

According to an implementation, facilitating the first connection can comprise facilitating the first connection via a control plane architecture of the first relay node device. Further to this implementation, the control plane architecture can comprise a star-type architecture. Additionally, facilitating the second connection can comprise facilitating the second connection via a user plane architecture of the second relay node device. The user plane architecture can comprise a multi-hop architecture and can be separated from the control plane architecture.

The method, according to some implementations, can comprise implementing, by the first relay node device, a control plane procedure based on using the first connection for a master cell group bearer of the first relay node device. Alternatively, or additionally, the method can comprise carrying, by the first relay node device, backhaul traffic over the second connection. The backhaul traffic can be carried on a secondary cell group bearer for the first relay node device and the second relay node device.

An embodiment relates to a communication network architecture that can comprise a control plane architecture of a relay node device. The control plane architecture can comprise a star-type architecture. Further, the communication network architecture can comprise a user plane architecture of the relay node device. The user plane architecture can be separated from (or independent of) the control plane architecture. Further, the user plane architecture can comprise a multi-hop architecture. The relay node device can be configured to operate according to a fifth generation wireless network communication protocol, or other advanced communication protocols.

In an example, the star-type architecture can comprise an architecture in which respective relay devices of a group of relay devices are directly connected to a donor node device. Further to this example, the control plane architecture can comprise respective integrated access and backhaul nodes devices of a group of integrated access and backhaul nodes being a single hop away from the donor node device.

According to some implementations, the control plane architecture can comprise communications interface messages sent to an access donor node device at the relay node device. Further to these implementations, the communications interface messages can comprise F1 application protocol messages.

In accordance with some implementations, the control plane architecture can comprise radio resource control messages sent to a device at the relay node device. In some implementations, the control plane architecture can comprise radio resource control messages sent to a user equipment device being served by an access donor node device. According to some implementations, the control plane architecture can comprise radio resource control messages carried inside F1 application protocol messages.

Another embodiment relates to a relay node device that can comprise a processor and a memory that stores executable instructions that, when executed by the processor, facilitate performance of operations. The relay node device can comprise a control plane comprising a star-type architecture and a user plane comprising a multi-hop architecture. The user plane can be separated from the control plane for mobility and handover purposes.

In an example, the control plane can comprise radio resource control messages sent to a user equipment device being served by an access donor node device. In another example, the radio resource control messages can be sent to a node of the relay node device. In a further example, the control plane can comprise communications interface messages sent to an access donor node of the relay node device.

According to an implementation, the star-type architecture can comprise an architecture in which respective relay devices of a group of relay devices are directly connected to a donor node device. Further to this implementation, the control plane can comprise respective integrated access and backhaul nodes of a group of integrated access and backhaul nodes being a single hop away from the donor node device.

Referring now to FIG. 1, illustrated is an example, non-limiting, wireless communication system 100 in accordance with one or more embodiments described herein. In one or more embodiments, the wireless communication system 100 can comprise one or more user equipment devices (UEs), illustrated as a first UE $102_1$, a second UE $102_2$. It is noted that although only two UEs are illustrated for purposes of simplicity, the wireless communication system 100 can comprise a multitude of UEs. The non-limiting term user equipment can refer to any type of device that can communicate with a network node in a cellular or mobile communication system. A UE can comprise one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment (e.g., the first UE $102_1$, the second UE $102_2$) can also comprise Internet of Things (IOT) devices that communicate wirelessly.

In various embodiments, the wireless communication system 100 is or can comprises a wireless communication network serviced by one or more wireless communication network providers. In example embodiments, a UE (e.g., the first UE $102_1$, the second UE $102_2$) can be communicatively coupled to the wireless communication network via a network node device 104. The network node (e.g., network node device) can communicate with user equipment (UE), thus providing connectivity between the UE and the wider cellular network.

A network node can comprise a cabinet and/or other protected enclosures, an antenna mast, and multiple antennas for performing various transmission operations (e.g., MIMO operations). Network nodes can serve several cells, also called sectors, depending on the configuration and type of antenna. In example embodiments, the UE (e.g., the first UE $102_1$, the second UE $102_2$) can send and/or receive communication data via a wireless link to the network node device 104. The dashed arrow lines from the network node device 104 to the UE (e.g., the first UE $102_1$, the second UE $102_2$) represent a downlink (DL) communications and the solid arrow lines from the UE (e.g., the first UE $102_1$, the second UE $102_2$) to the network nodes (e.g., the network node device 104) represents an uplink (UL) communication.

The wireless communication system 100 can further comprise one or more communication service provider networks 106 that can facilitate providing wireless communication services to various UEs, (e.g., the first UE $102_1$, the second UE $102_2$), via the network node device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks, Wi-Fi service networks, broadband service network, enterprise networks, cloud based networks, and the like. For example, in at least one implementation, wireless communication system 100 can be or can include a large scale wireless communication network that spans various geographic areas. According to this implementation, the one or more communication service provider networks 106 can be or can include the wireless communication network and/or various additional devices and components of the wireless communication network (e.g., additional network devices and cell, additional UEs, network server devices, etc.). The network node device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation modes to facilitate wireless radio communications between devices (e.g., the UE (e.g., the first UE $102_1$, the second UE $102_2$) and the network node device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000, and so on.

For example, the wireless communication system 100 can operate in accordance with Global System for Mobile Communications (GSM), Universal Mobile Telecommunications Service (UMTS), Long Term Evolution (LTE), LTE frequency division duplexing (LTE FDD), LTE Time Division Duplexing (TDD), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-Carrier Code Division Multiple Access (MC-CDMA), Single-Carrier Code Division Multiple Access (SC-CDMA), Single-Carrier FDMA (SC-FDMA), Orthogonal Frequency Division Multiplexing (OFDM), DISCRETE FOURIER TRANSFORM SPREAD OFDM (DFT-spread OFDM) Single Carrier FDMA (SC-FDMA), FILTER BANK BASED MULTI-CARRIER (FBMC), Zero Tail DFT-spread-OFDM (ZT DFT-s-OFDM), Generalized Frequency Division Multiplexing (GFDM), Fixed Mobile Convergence (FMC), Universal Fixed Mobile Convergence (UFMC), UNIQUE WORD OFDM (UW-OFDM), Unique Word DFT-spread OFDM (UW DFT-Spread-OFDM), Cyclic Prefix OFDM CP-OFDM, resource-block-filtered OFDM, Wi Fi, WLAN, WiMax, and the like. However, various features and functionalities of the wireless communication system 100 are particularly described wherein the devices (e.g., the UEs (e.g., the first UE $102_1$, the second UE $102_2$) and the network node device 104) of the wireless communication system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to MultiCarrier (MC) or Carrier Aggregation (CA) operation of the UE. The term carrier aggregation is also called (e.g. interchangeably called) "multi-carrier system," "multi-cell operation," "multi-carrier operation," "multi-carrier" transmission and/or reception. Note that some embodiments are also applicable for Multi RAB (radio bearers) on some carriers (that is data plus speech is simultaneously scheduled).

In various embodiments, the wireless communication system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Figure 2:
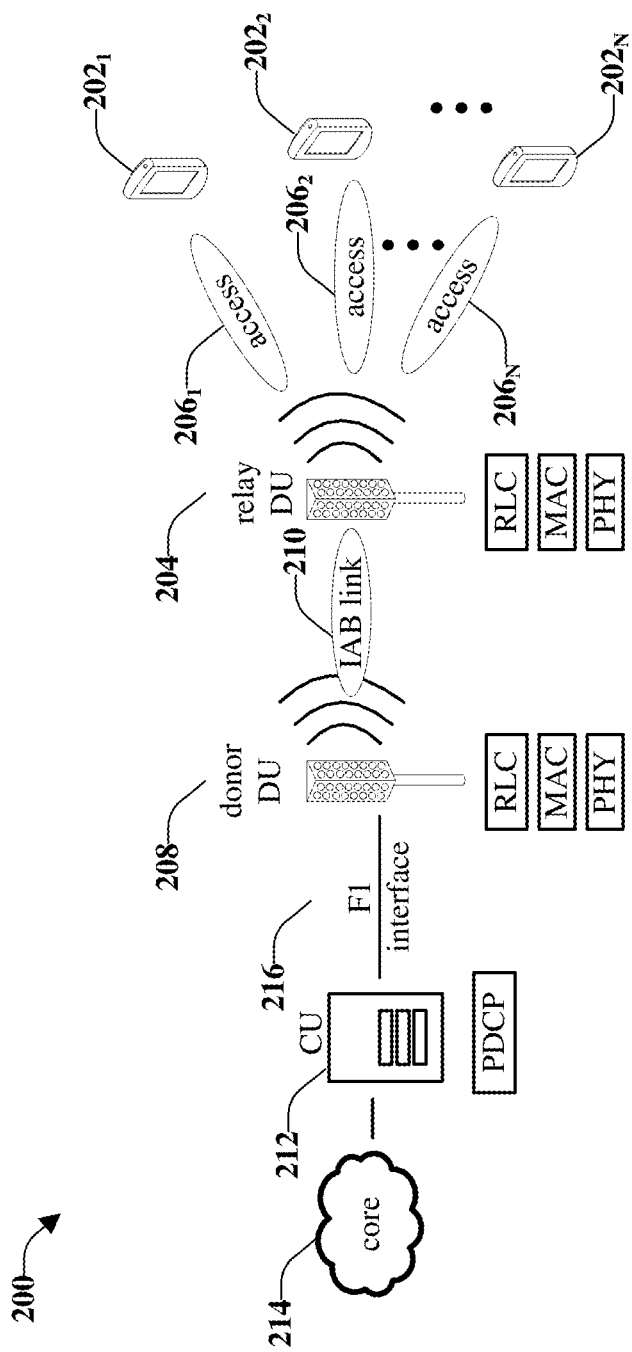
FIG. 2 illustrates an example, non-limiting, embodiment of a mobile network (e.g., a wireless communications system) in accordance with one or more embodiments described herein.

For example, FIG. 2 illustrates an example, non-limiting, embodiment of a mobile network (e.g., a wireless communications system 200) in accordance with one or more embodiments described herein. The wireless communications system 200 is an example of the integrated access and backhaul links discussed above.

User Equipment (UE), illustrated as a first UE $202_1$, a second UE $202_2$, through an Nth UE $202_N$ (e.g., the first UE $102_1$, the second UE $102_2$), where N is an integer, can connect to a relay node (e.g., a relay DU 204). For example, the UEs (e.g., the first UE $202_1$, the second UE $202_2$, and the Nth UE $202_N$) can connect to the relay DU 204 via respective access links (e.g., a first access link $206_1$, a second access link $206_2$, through an Nth access link $206_N$). The relay DU 204 can operate (e.g., function) as a traditional base station from the perspective of the UEs (e.g., the first UE $202_1$, the second UE $202_2$, and the Nth UE $202_N$). According to some implementations, the relay DU 204 (e.g., a relay node) can multiplex access and backhaul links in time, frequency, or space (e.g. beam-based operation).

The relay DU 204 can connect to a donor DU 208 via a relay/backhaul link. The relay/backhaul link (e.g., IAB Link 210) can share the same air interface as the access link (e.g., the first access link $206_1$, the second access link $206_2$, through the Nth access link $206_N$) between the UEs (e.g., the first UE $202_1$, the second UE $202_2$, and the Nth UE $202_N$) and the relay DU 204.

The IAB link 210 between the donor DU 208 and the relay DU 204 can carry user plane and control plane data for all the UEs (e.g., the first UE $202_1$, the second UE $202_2$, and the Nth UE $202_N$) being served by the relay DU 204. Hence, the IAB link 210 can comprise multiplexed packets for/from multiple different bearers serving the UEs that are being served by the relay DU 204, as well as multiplexed packets from the backhaul communication between the relay DU 204 and the donor DU 208. As noted above, the same spectrum is being used for both backhaul and access links, and as such, an IAB link can employ different multiplexing schemes to allow for UL and DL transmissions using the backhaul and access links.

Further, unlike the relay DU 204, the donor DU 208 can have a wired connection to a Centralized Unit (CU 212), which can connect to the core network (CN 214). The network interface (e.g., communications interface) between the CU 212 and donor DU 208 can be referred to as the F1 (or F1-U) interface 216 (e.g., per 3GPP specifications). Although not illustrated, according to some implementations, the Donor DU 208 can serve one or more UEs.

An IAB framework can allow for a multi-hop network based on a hierarchical tree architecture. In this type of IAB framework, all the relay nodes (also referred to as IAB nodes) have to be fixed. The IAB framework could support dynamic route switching and topology adaptation, however, these can only be supported at slower time-scales. Not at the time-scales at which mobility events happen particularly when deployed in a small cell environment.

Figure 3:
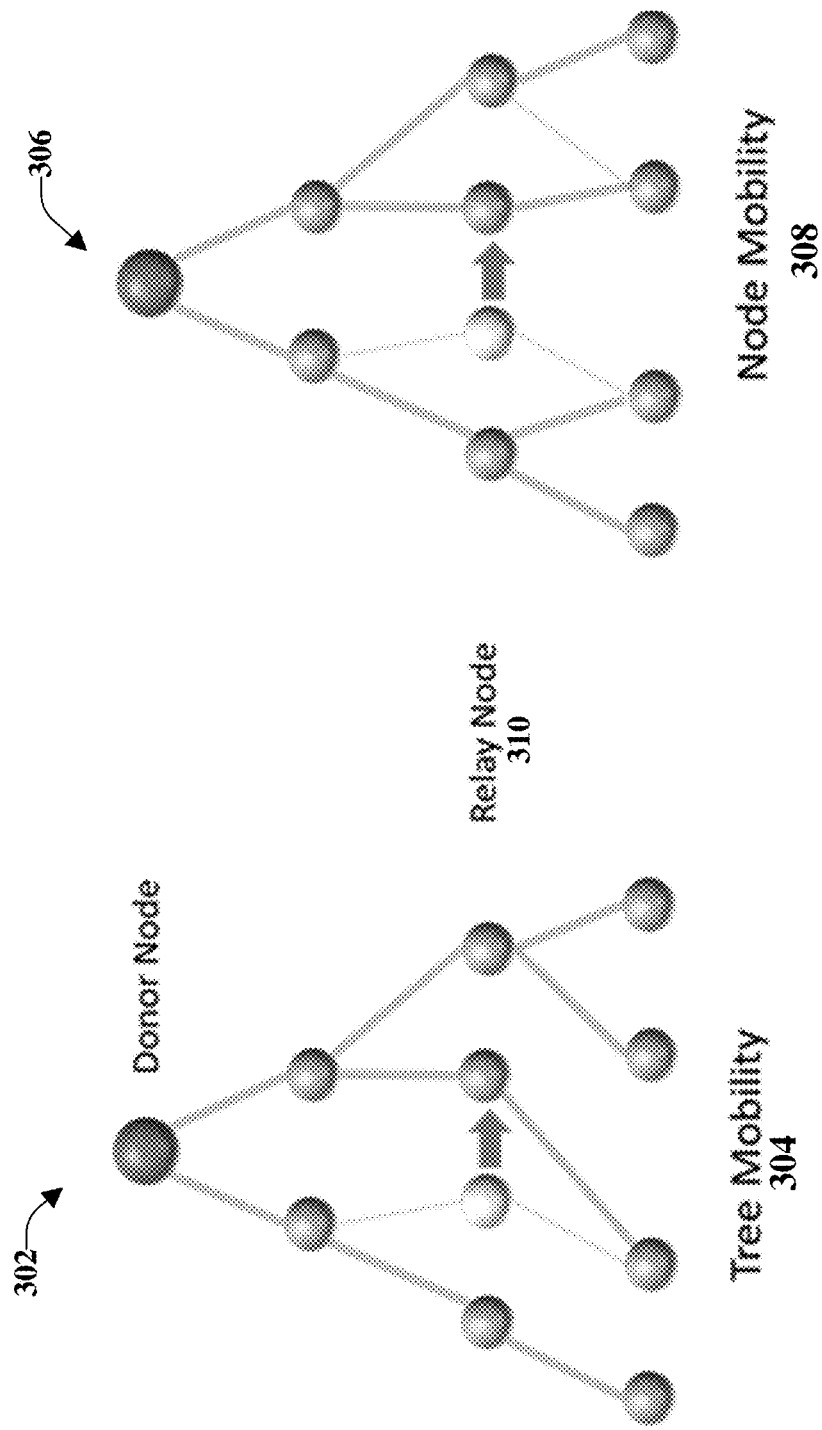
FIG. 3 illustrates different mobility types in an integrated access and backhaul network in accordance with one or more embodiments described herein.

FIG. 3 illustrates different mobility types in an IAB network in accordance with one or more embodiments described herein. Repetitive description of like elements employed in other embodiments described herein is omitted for sake of brevity.

Illustrated are a first tree structure 302, which represents a tree mobility 304 hierarchy of nodes, and a second tree structure 306, which represents a node mobility 308 hierarchy of nodes. In a multi-hop IAB network the different mobility models (e.g., the tree mobility 304 and/or the node mobility 308) can be observed.

In the case of the tree mobility 304, when a relay node 310 performs a handover, all of the tree structure below it remains the same. In other words, the relay nodes below the mobile node in the tree do not change their association. This kind of tree-based mobility can be supported in 3 GPP Release 16 IAB since this only requires the basic UE (MT) mobility that is already supported by Release 15. However, a tree-based mobility is not good enough to support mobile relays since sooner or later the child node, which may have a very different mobility condition will need to change its association.

In the case of the node mobility 308, when a given relay node (e.g., the relay node 310) undergoes a handover, all of its child nodes (e.g., the nodes of the tree beneath the relay node) may undergo handover also.

In the case of mobile relays, such as node-based mobility (e.g., the node mobility 308) can be more desirable since different nodes of the tree may be moving in different directions, therefore mobility of one node can lead to changes in the topological association of other nodes. In addition, the handover/topology change event triggers can take into account multiple factors including, for example, hop order, relay (relative) velocity, and number of connected decedents at the relay node and/or target parent node, in addition to normal Radio Resource Management (RRM) measurements or mobility event thresholds. The node-based mobility can be managed by the parent nodes/network or may be initiated by the relay node directly via an autonomous or conditional handover procedure.

In an example, Release 16 of 3GPP specification for IAB supports tree-based mobility, which can be useful for various purposes, such as load balancing, mitigation of blocking, and so on. However, tree-based mobility does not support a full node-based mobility that is needed for mobile relays.

In order to provide a robust and reliable solution for mobile IAB network, provided herein is an architecture where the control plane architecture and the user plane architecture of the relay node are separated. The user plane can be based on a multi-hop architecture (which can be similar to that of Release 16 IAB). However, the control plane can be based on a star architecture (e.g., a star-type architecture or star-type configuration). In a star-type architecture, each relay-MT is directly connected to the donor. This implies that for the control plane, every IAB node is always exactly one hop away from the donor node.

Figure 4:
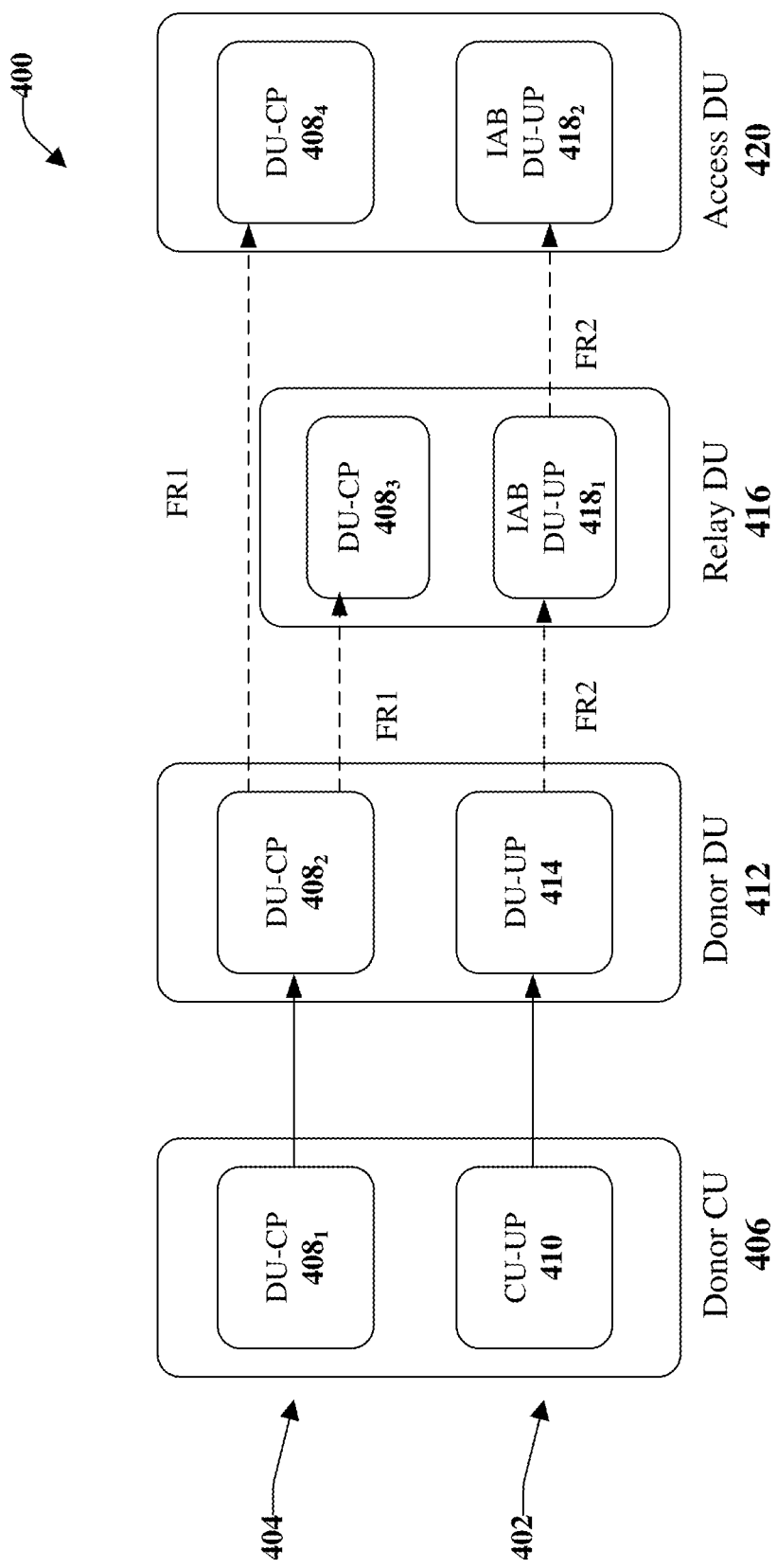
FIG. 4 illustrates a schematic representation of separation of user plane and control plane architecture in accordance with one or more embodiments described herein.

FIG. 4 illustrates a schematic representation 400 of separation of user plane and control plane architecture in accordance with one or more embodiments described herein. Repetitive description of like elements employed in other embodiments described herein is omitted for sake of brevity.

The user plane architecture 402 is illustrated at the lower portion of FIG. 4, and the control plane architecture 404 is illustrated at the upper portion of FIG. 4. As illustrated a Donor Central-Unit (CU) or Donor CU 406 can comprise a first Distributed Unit (Du) Control Plane (CP) or first DU-CP function $408_1$ and a Central-Unit (CU) User Plane or CU-UP Function 410. A Donor DU 412 can comprise a second DU-CP function $408_2$ and a DU-UP Function 414. Further, a relay DU 416 can comprise a third DU-CP function $408_3$ and a first IAB DU-UP Function $418_1$. In addition, an Access DU 420 can comprise a fourth DU-CP function $408_4$ and a second IAB DU-UP Function $418_2$.

Figure 5:
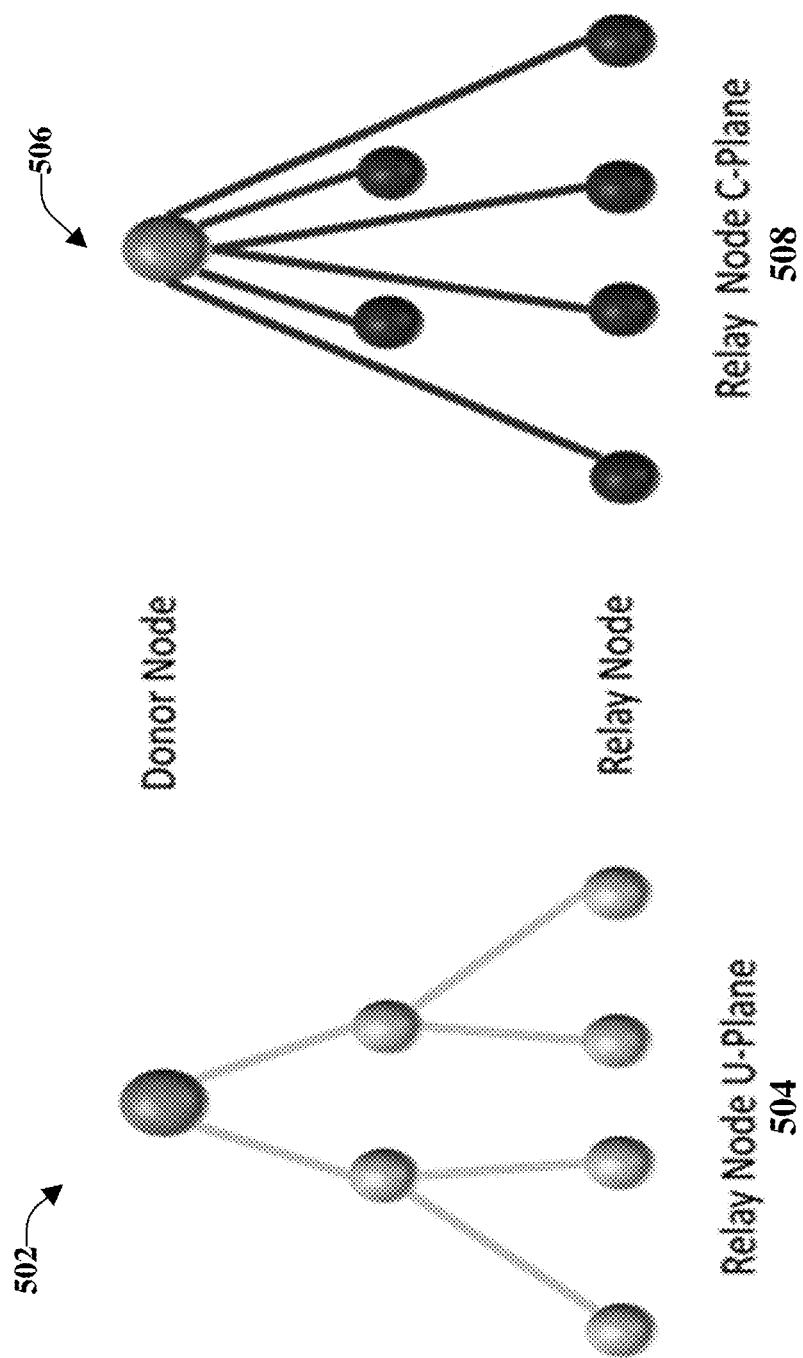
FIG. 5 illustrates a topology of control plane and user plane for mobile integrated access and backhaul in accordance with one or more embodiments described herein.

FIG. 5 illustrates a topology of control plane and user plane for mobile IAB in accordance with one or more embodiments described herein. Repetitive description of like elements employed in other embodiments described herein is omitted for sake of brevity.

Illustrated in FIG. 5 are a first tree structure 502 that comprises a relay node user plane 504 (on the left) and a second tree structure 506 that comprises a relay node control plane 508 (on the right). Note that the control plane includes F1-AP messages sent to the Access DU at the relay node, or Radio Resource Control (RRC) messages sent to the MT at the relay node, and/or RRC messages sent to the UE being served by the Access DU. According to some implementations, one or more RRC messages can be carried inside F1-AP messages.

FIGS. 4 and 5 illustrate mobile IAB networks where the user plane (U-plane) and control plane (C-plane) have separate architectures (e.g., the user plane architecture 402, the control plane architecture 404). A benefit of such a separation of the control and user plane is that mobility and handover of a given node does not trigger handover of a child node since the respective control-plane (primary) connection of each node is directly to the donor. This is especially true when the control plane is connected via sub-6 GHz (FR1) frequencies that allow longer range connectivity compared to mmWave (FR2) frequencies, as also indicated in FIG. 4. The use of FR1 for the control plane connection makes it possible to significantly reduce the need for handover of the child node.

Additionally, the star topology for the control plane can enable centralization of measurement/metric reporting and configuration in the Mobile IAB network, without requiring the control plane signaling to traverse multiple hops which could incur latency or link failures due to intermediate node mobility. In addition, the control plane signaling can be secured end-to-end between the relay node and the donor without requiring multiple tunnels/hops for the security protocol exchange. In addition, the user plane data can use a different security protocol and signaling mechanism than the control plane traffic (e.g., Packet Data Convergence Protocol (PDCP) versus Network Domain Security (NDS)).

This type of separation can be achieved by utilizing dual connectivity at the relay MT. The relay MT can use the donor node as the MCG and the relay DUs as SCG. Thus, under this dual connectivity framework node mobility and re-attachment of child nodes to different parents can be handled by SCG reconfiguration rather than a full-blown handover.

In addition, the connectivity between the relay MT and a parent relay node may not require a full RRC connection, such as a fixed IAB node MT, but can be managed at a lower layer (e.g. Adapt or MAC layer). This can have benefits in terms of less overhead and reduced latency in the signaling, which can be beneficial when the nodes experience frequent topology adaptation/mobility events.

According to some implementations, in a multi-hop mobile IAB network each relay node can maintain two separate connections for MCG and SCG. The MCG can be the donor node. The MCG connection can typically be in sub 6 GHz spectrum; however, other spectrums can be utilized with the disclosed aspects. The SCG for each relay node can be another relay node at a lower hop order.

In accordance with some implementations, all backhaul traffic can be carried on the SCG bearer for the relay nodes. Further, in some implementations, the MCG bearer can be used for various control plane procedures. Such procedures include, but are not limited to, handover signaling, routing table updates, and SCG reconfiguration to add and/or remove SCG nodes on the user plane.

Further, the control plane user plane separation via dual connectivity can be for the relay node MT. All the access UE can still connect to the network as a regular UE, (e.g., without dual connectivity) according to various implementations.

Release 16 IAB allows for the deployment of a multi-hop network by utilizing relaying over the air. However, the Rel 16 design of IAB requires the relay nodes to be fixed. This limits the use cases and applicability of this feature. For example, use cases such as group-mobility or deployment of relay nodes on mobile infrastructure such as busses, drone, and so on is not possible. The disclosed aspects provide a solution by allowing the relay nodes to be fully mobile.

The disclosed aspects can be based on having separate topology on the control plane and the user plane of the relay nodes. The user plane can have a multi-hop topology. However, the control plane is de-coupled and has a single hop star topology. In other words, every node is just one hop away from the donor node on the control plane. In one embodiment, dual connectivity can be used to separate control plane connection and the user plane connection, thereby allowing for completely independent topology on them.

Since the control plane is always one hop away from the donor, traditional Rel 15 mobility can support the mobility of the relay node within the donor. Core network based handover mechanism from Rel 15 can also support the mobility of the relay node between two donors. This also means that for the user plane there is no need for any mobility procedures when the relay node's user plane changes the parent node. This can be accomplished simply by SCG reconfiguration which is simpler and more light weight RRC procedure. Moreover, since each relay node maintains a single hop from the donor on the control plane, the SCG reconfiguration signaling can be sent on the control plane. This separate topology on the user plane and the single hop control plane can allow for a robust mobility design. When a relay node moves from one parent to another, the topology of the network and the associated routing can be changed very easily and reliably by using the single hop control plane.

Figure 6:
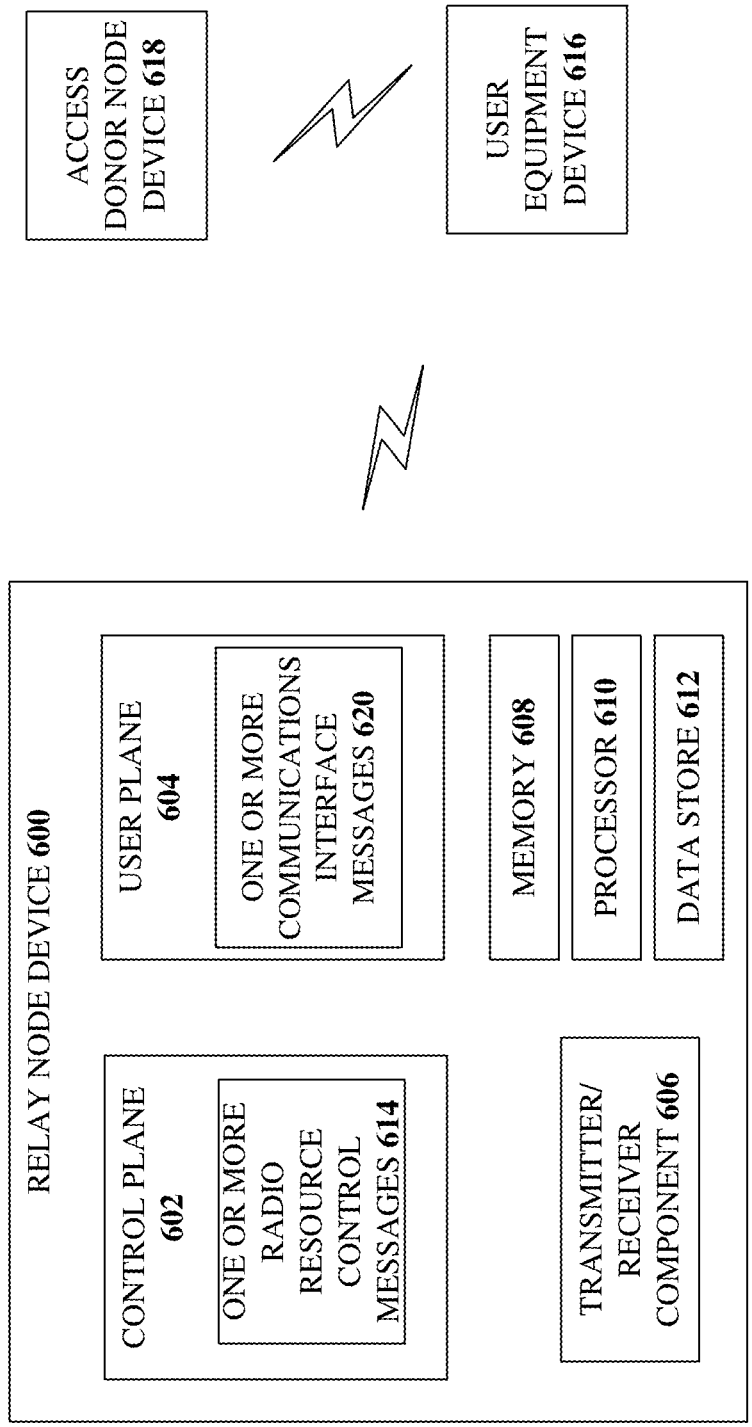
FIG. 6 illustrates an example, non-limiting, relay node device that can facilitate mobile integrated access and backhaul in advanced networks in accordance with one or more embodiments described herein.

FIG. 6 illustrates an example, non-limiting, relay node device 600 that can facilitate mobile integrated access and backhaul in advanced networks in accordance with one or more embodiments described herein. Aspects of the relay node device 600, apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. According to some implementations, the relay node device 600 can be a network device of a group of network devices. Repetitive description of like elements employed in other embodiments described herein is omitted for sake of brevity.

In various embodiments, the relay node device 600 can be any type of component, machine, device, facility, apparatus, and/or instrument that comprises a processor and/or can be capable of effective and/or operative communication with a wired and/or wireless network.

As illustrated in FIG. 6, the relay node device 600 can include a control plane 602, a user plane 604, a transmitter/receiver component 606, at least one memory 608, at least one processor 610, and at least one data store 612. The control plane 602 can comprise a star-type architecture (e.g., similar to the second tree structure 506). In an example, the star-type architecture can comprise an architecture in which respective relay devices of a group of relay devices are directly connected to a donor node device. Further, the control plane 602 can comprise respective integrated access and backhaul nodes of a group of integrated access and backhaul nodes being a single hop away from the donor node device.

The user plane 604 can comprise a multi-hop architecture (e.g., similar to the first tree structure 502). The user plane 604 can be separated from the control plane 602 for mobility and handover purposes.

According to some implementations, the control plane 602 can comprise one or more radio resource control messages 614. The one or more radio resource control messages 614 can be sent to a user equipment device 616 being served by an access donor node device 618 (via the transmitter/receiver component 606). According to some implementations, the one or more radio resource control messages 614 can be sent to a node of the relay node device 600.

Further, the control plane 602 can comprise one or more communications interface messages 620. The one or more communications interface messages 620 can be sent to an access donor node of the relay node device 600.

The transmitter/receiver component 606 can be configured to transmit to, and/or receive data from, the user equipment device 616, other network devices, and/or other communication devices. Through the transmitter/receiver component 606, the relay node device 600 can concurrently transmit and receive data, can transmit and receive data at different times, or combinations thereof. According to some implementations, the transmitter/receiver component 606 can facilitate communications between the relay node device 600 and the user equipment device 616.

The at least one memory 608 can be operatively connected to the at least one processor 610. The at least one memory 608 can store executable instructions that, when executed by the at least one processor 610 can facilitate performance of operations. Further, the at least one processor 610 can be utilized to execute computer executable components stored in the at least one memory 608.

For example, the at least one memory 608 can store protocols associated with mobile integrated access and backhaul in advanced networks as discussed herein. Further, the at least one memory 608 can facilitate action to control communication between the relay node device 600, the user equipment device 616, other network devices, and/or other user equipment devices such that the relay node device 600 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 610 can facilitate respective analysis of information related to integrated access and backhaul in advanced networks. The at least one processor 610 can be a processor dedicated to analyzing and/or generating information received, a processor that controls one or more components of the relay node device 600, and/or a processor that both analyzes and generates information received and controls one or more components of the relay node device 600.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node device 104) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 7:
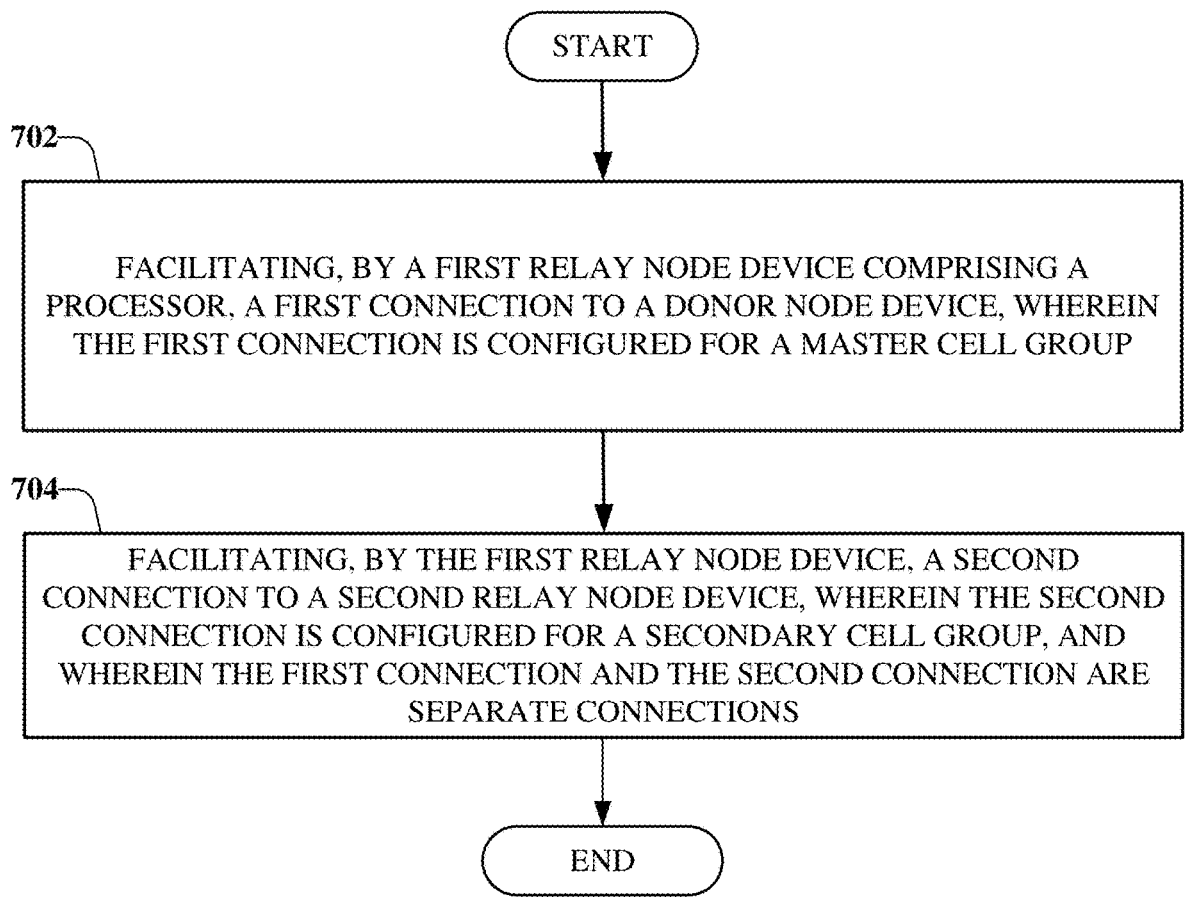
FIG. 7 illustrates a flow diagram of an example, non-limiting, computer-implemented method that facilitates separation of a user plane and control plane associated with a relay node device in accordance with one or more embodiments described herein.

FIG. 7 illustrates a flow diagram of an example, non-limiting, computer-implemented method 700 that facilitates separation of a user plane and control plane associated with a relay node device in accordance with one or more embodiments described herein. Repetitive description of like elements employed in other embodiments described herein is omitted for sake of brevity.

In some implementations, a system comprising a processor can perform the computer-implemented method 700, and/or other methods discussed herein. In other implementations, a device (e.g., the relay node device 600) comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a first relay node device operatively coupled to one or more processors, can facilitate a first connection to a donor node device. The first connection can be configured for a master cell group.

According to some implementations, facilitating the first connection can comprise facilitating the first connection via a control plane architecture of the first relay node device. The control plane architecture can comprise a star-type architecture. In a star-type architecture, each relay-MT is directly connected to the donor. Thus, for the control plane, every IAB node is always exactly one hop away from the donor node.

Further, at 704 of the computer-implemented method 700, the first relay node device can facilitate a second connection to a second relay node device. The second connection can be configured for a secondary cell group. In addition, the first connection and the second connection can be separate connections.

In accordance with some implementations, facilitating the second connection can comprise facilitating the second connection via a user plane architecture of the second relay node. The user plane architecture can comprise a multi-hop architecture and can be separated from the control plane architecture.

Figure 8:
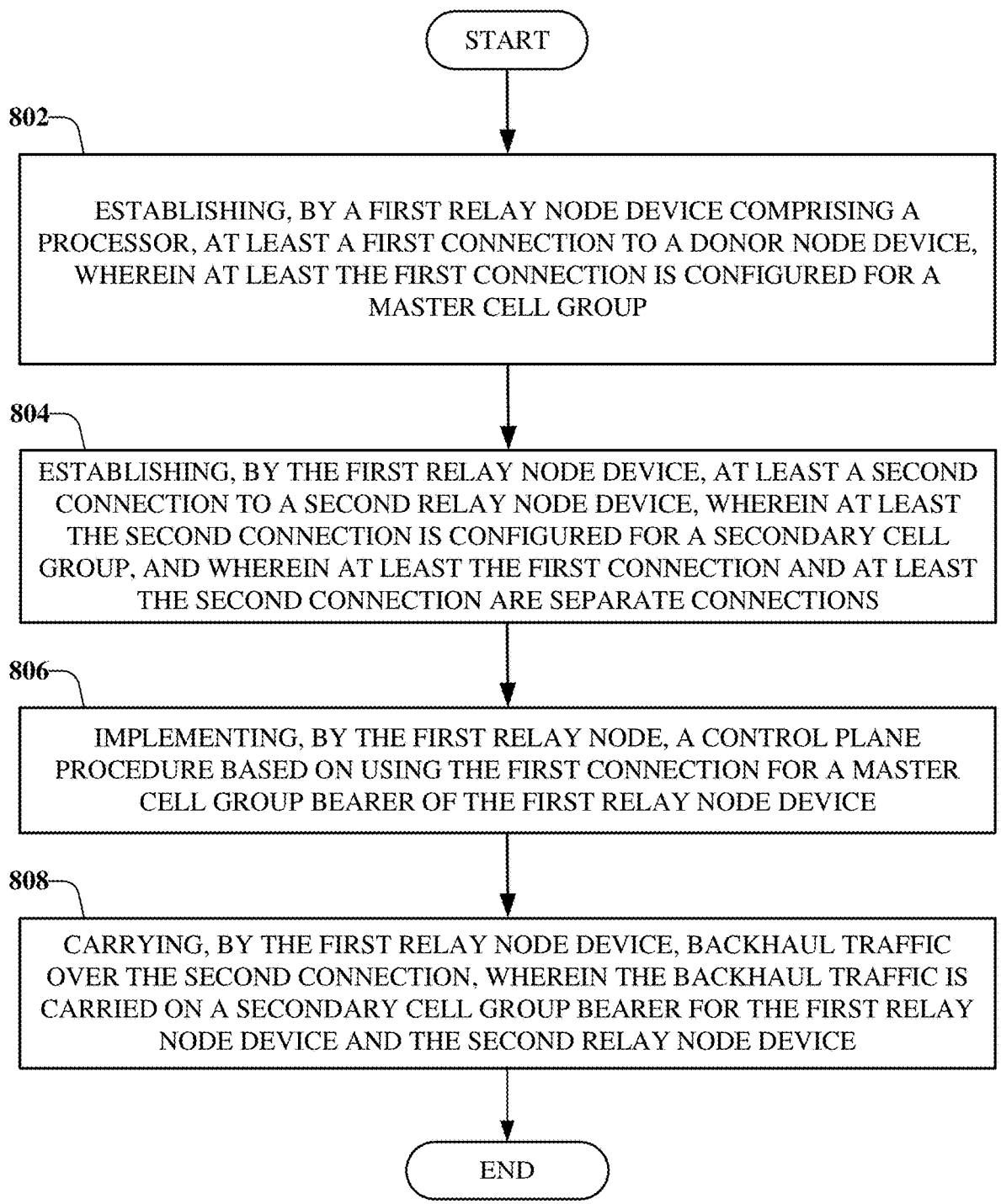
FIG. 8 illustrates a flow diagram of an example, non-limiting, computer-implemented method that facilitates integrated access and backhaul in advanced networks in accordance with one or more embodiments described herein.

FIG. 8 illustrates a flow diagram of an example, non-limiting, computer-implemented method 800 that facilitates integrated access and backhaul in advanced networks in accordance with one or more embodiments described herein. Repetitive description of like elements employed in other embodiments described herein is omitted for sake of brevity.

In some implementations, a system comprising a processor can perform the computer-implemented method 700, the computer-implemented method 800, and/or other methods discussed herein. In other implementations, a device (e.g., the relay node device 600) comprising a processor can perform the computer-implemented method 700, the computer-implemented method 800, and/or other methods discussed herein. In other implementations, a machine-readable storage medium, can comprise executable instructions that, when executed by a processor, facilitate performance of operations, which can be the operations discussed with respect to the computer-implemented method 700, the computer-implemented method 800, and/or other methods discussed herein. In further implementations, a computer readable storage device comprising executable instructions that, in response to execution, cause a system comprising a processor to perform operations, which can be operations discussed with respect to the computer-implemented method 700, the computer-implemented method 800, and/or other methods discussed herein.

The computer-implemented method 800 can start, at 802, when at least a first connection to a donor node device can be established by a first relay node device (e.g., the relay node device 600). At least the first connection can be configured for a master cell group. Further, at 804 of the computer-implemented method 800, at least a second connection to a second relay node device can be established by a first relay node device. At least the second connection can be configured for a secondary cell group. According to various implementations, at least the first connection and at least the second connection can be separate connections.

According to some implementations, establishing the first connection can comprise establishing the first connection via a control plane architecture of the first relay node device. The control plane architecture can comprise a star-type architecture. Additionally, or alternatively, in some implementations, establishing the second connection can comprise facilitating the second connection via a user plane architecture of the second relay node. The user plane architecture can comprise a multi-hop architecture and can be separated from the control plane architecture.

The computer-implemented method 800 can also comprise, at 806, implementing, by the first relay node, a control plane procedure based on using the first connection for a master cell group bearer of the first relay node device. Alternatively, or additionally, at 808 the computer-implemented method 800 can comprise, carrying, by the first relay node device, backhaul traffic over the second connection, wherein the backhaul traffic is carried on a secondary cell group bearer for the first relay node device and the second relay node device.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

There can be various services that 5G NR systems should satisfy. For example, 5G NR should provide Enhanced Mobile BroadBand (eMBB) services, which can be utilized for high broadband applications where the data rate is the main criteria. In another example, 5G NR should provide URLLC services, which can be used for ultra-reliable communications where the packet error rate of $10^{(-5)}$ is required with less delay. In yet another example, 5G NR should provide Massive Machine Type Communication (mMTC) services, which can be utilized for connecting machine type of communications, where the In some embodiments, the non-limiting term radio network node or simply network node is used and it refers to any type of network node serving UE and/or connected to other network nodes or network elements or any radio node from where a UE receives signal. Examples of radio network nodes are Node B, Base Station (BS), Multi-Standard Radio (MSR) radio node such as MSR BS, gNodeB, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in distributed antenna system (DAS) system, and so on.

In some embodiments the non-limiting term user equipment (UE) is used and it refers to any type of wireless device communicating with a radio network node in a cellular or mobile communication system. Examples of UE are target device, device to device (D2D) UE, machine type UE or UE capable of machine to machine (M2M) communication, PDA, iPad, tablet, mobile terminals, smart phone, laptop embedded equipped (LEE), laptop mounted equipment (LME), USB dongles etc.

The various embodiments are described in particular for NR. The various embodiments are however applicable to any RAT or multi-RAT system where the UE operates using multiple carriers (e.g. LTE FDD/TDD, GSM/GERAN, Wi Fi, WLAN, WiMax, CDMA2000 etc.)

Described herein are architectures, models, systems, devices, nodes, methods, articles of manufacture, and other embodiments or implementations that can facilitate and support mobile relays based on an integrated access and backhaul concept for advanced networks (e.g., 4G, 5G, and beyond). Facilitating and supporting mobile relays based on an integrated access and backhaul concept for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
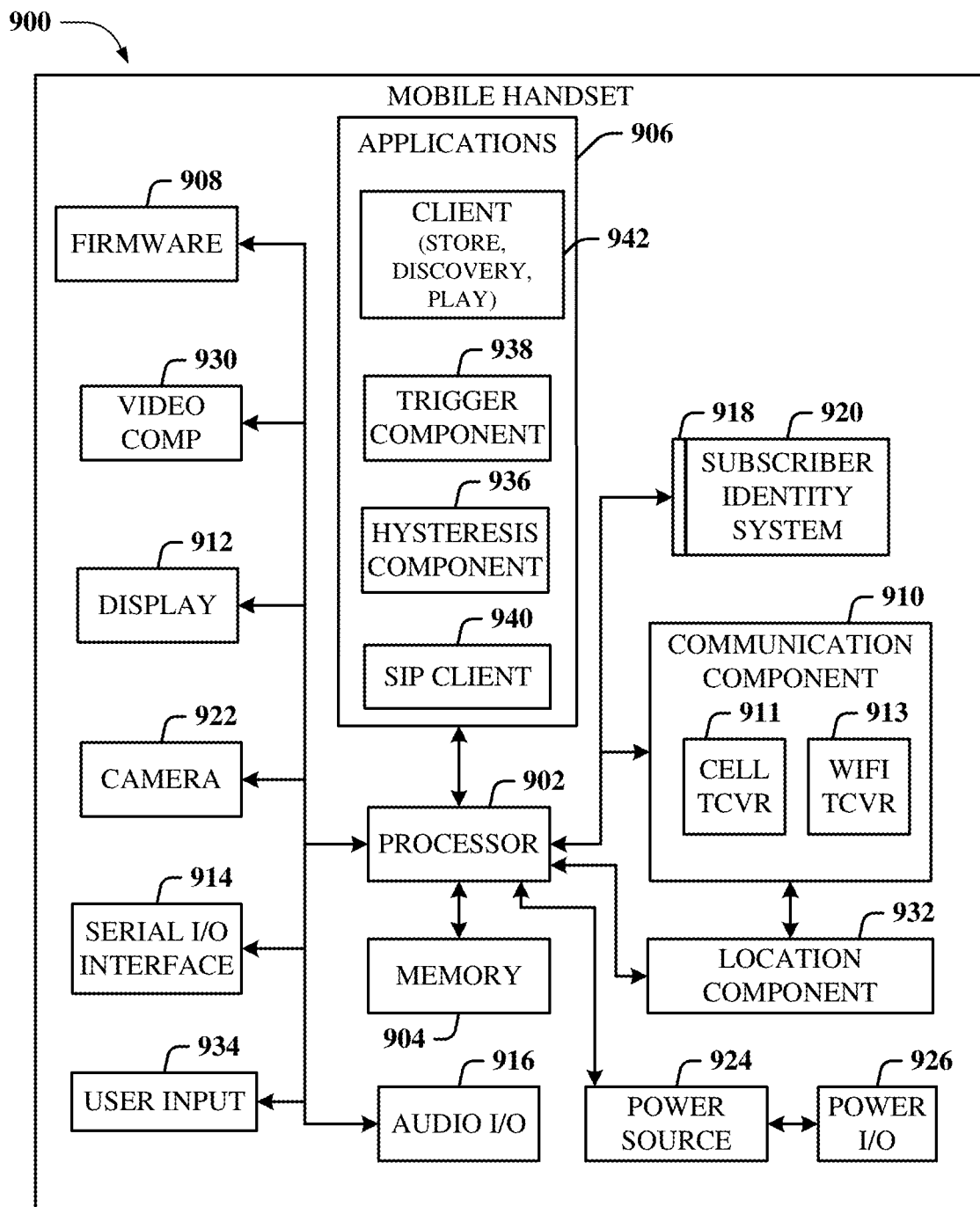
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
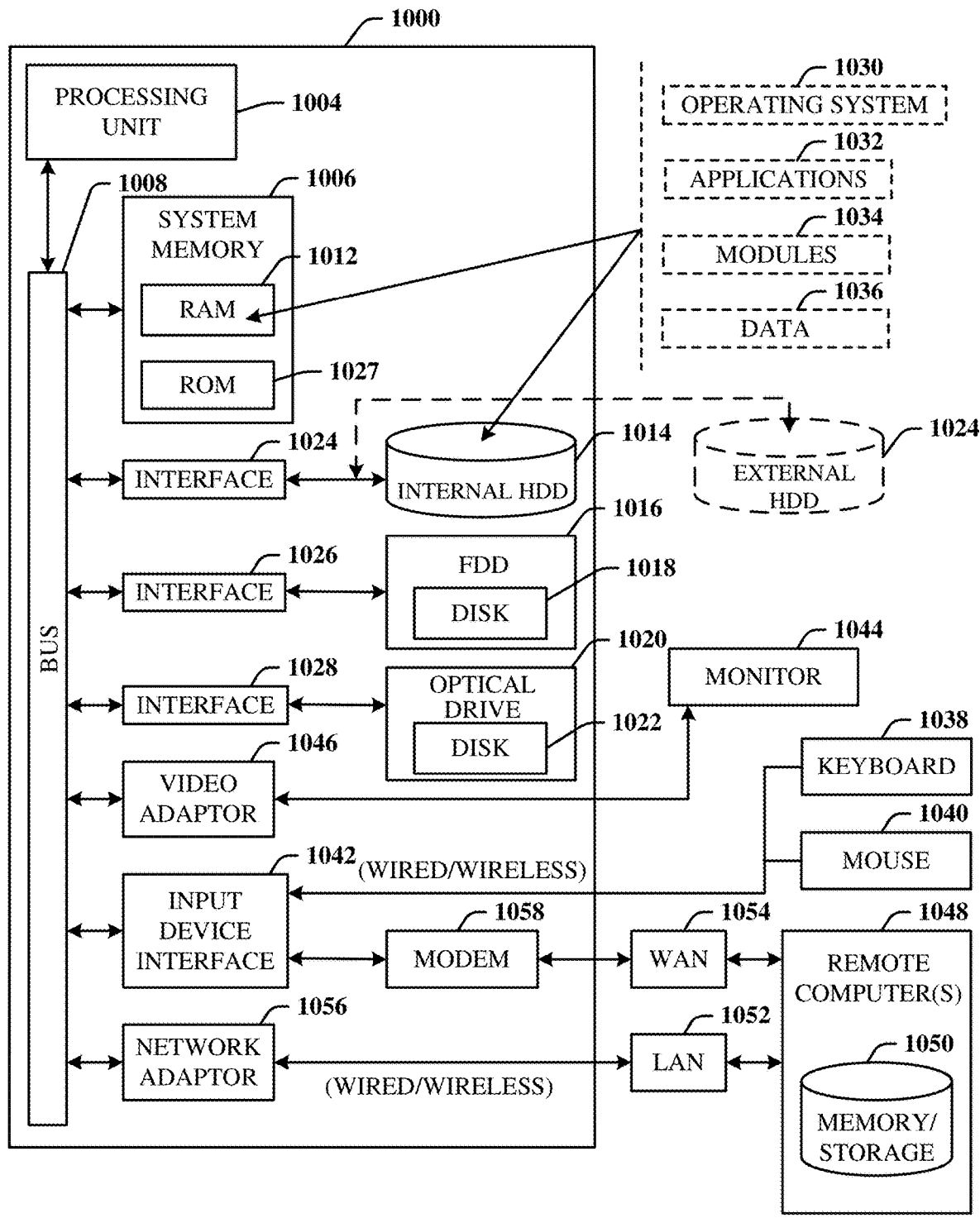
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk $102_2$ or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
facilitating, by first relay node equipment comprising a processor, establishing a first connection to donor node equipment via a first control plane function of the first relay node equipment and a second control plane function of the donor node equipment, wherein the first control plane function and the second control plane function utilize a first security protocol for control plane traffic, wherein the first connection is configured for a master cell group, and wherein the first control plane function of the first relay node equipment and the second control plane function of the donor node equipment establish a star-type architecture between the first relay node equipment and the donor node equipment in an integrated access and backhaul network; and
facilitating, by the first relay node equipment, establishing a second connection to second relay node equipment via a first user plane function of the first relay node equipment and a second user plane function of the second relay node equipment, wherein the first user plane function and the second user plane function utilize a second security protocol, different from the first security protocol, for user plane traffic, wherein the first user plane function of the first relay node equipment and the second user plane function of the second relay node equipment establish a multi-hop architecture between the first relay node equipment and the second relay node equipment in the integrated access and backhaul network, wherein the first user plane function is separated from, and operates independently of, the first control plane function, wherein the second connection is configured for a secondary cell group, wherein the first connection and the second connection are separate connections, and wherein a first handover of the first relay node equipment does not trigger a second handover of a child node of the first relay node equipment based on the star-type architecture.

2. The method of claim 1, further comprising:
implementing, by the first relay node equipment, a control plane procedure based on using the first connection for a master cell group bearer of the first relay node equipment.

3. The method of claim 1, further comprising:
carrying, by the first relay node equipment, backhaul traffic over the second connection, wherein the backhaul traffic is carried on a secondary cell group bearer for the first relay node equipment and the second relay node equipment.

4. The method of claim 1, wherein the master cell group comprises the donor node equipment, and wherein the secondary cell group comprises the child node, and wherein the child node is a relay node at a lower hop order as compared to the first relay node equipment.

5. The method of claim 1, wherein the first relay node equipment and the second relay node equipment are configured for full mobility within a communications network.

6. The method of claim 1, wherein the first relay node equipment is classified as a drone device.

7. The method of claim 1, further comprising:
facilitating, by the first relay node equipment, transmission of secondary cell group reconfiguration signaling via the second connection.

8. The method of claim 1, wherein the first relay node equipment and the second relay node equipment are configured to operate according to a fifth generation communication protocol.

9. A system, comprising:
a processor; and
a memory that stores executable instructions that, when executed by the processor, facilitate performance of operations, comprising:
establishing a first connection between a first relay node equipment and a donor node equipment via a first control plane of the first relay node equipment and a second control plane of the donor node equipment, wherein the first control plane and the second control plane utilize a first security protocol for control plane traffic, wherein the first connection is configured for a master cell group, and wherein the first control plane of the first relay node equipment and the second control plane of the donor node equipment establish a star-type architecture between the first relay node equipment and the donor node equipment in an integrated access and backhaul network; and
establishing a second connection between the first relay node equipment and a second relay node equipment via a first user plane of the first relay node equipment and a second user plane of the second relay node equipment, wherein the first user plane and the second user plane utilize a second security protocol, different from the first security protocol, for user plane traffic, wherein the first user plane of the first relay node equipment and the second user plane of the second relay node equipment establish a multi-hop architecture between the first relay node equipment and the second relay node equipment in the integrated access and backhaul network,
wherein the first user plane is separated from, and operates independently of, the first control plane, wherein the second connection is configured for a secondary cell group, wherein the first connection and the second connection are separate connections, and wherein a first handover of the first relay node equipment does not trigger a second handover of a child node of the first relay node equipment based on the star-type architecture.

10. The system of claim 9, wherein the operations further comprise:
implementing a control plane procedure based on using the first connection for a master cell group bearer of the first relay node equipment.

11. The system of claim 9, wherein the operations further comprise:
carrying backhaul traffic over the second connection, wherein the backhaul traffic is carried on a secondary cell group bearer for the first relay node equipment and the second relay node equipment.

12. The system of claim 9, wherein the master cell group comprises the donor node equipment, and wherein the secondary cell group comprises the child node, and wherein the child node is a relay node at a lower hop order as compared to the first relay node equipment.

13. The system of claim 9, wherein the operations further comprise:
transmitting secondary cell group reconfiguration signaling via the second connection.

14. The system of claim 9, wherein the first relay node equipment and the second relay node equipment are classified as drone-type devices.

15. A non-transitory machine-readable medium, comprising executable instructions that, when executed by a processor, facilitate performance of operations, comprising:
establishing a first connection between first relay node equipment and donor node equipment via a first control plane of the first relay node equipment and a second control plane of the donor node equipment, wherein the first control plane and the second control plane utilize a first security protocol for control plane traffic, wherein the first connection is configured for a master cell group, and wherein the first control plane of the first relay node equipment and the second control plane of the donor node equipment establish a star-type architecture between the first relay node equipment and the donor node equipment in an integrated access and backhaul network; and
establishing a second connection between the first relay node equipment and a second relay node equipment via a first user plane of the first relay node equipment and a second user plane of the second relay node equipment, wherein the first user plane and the second user plane utilize a second security protocol, different from the first security protocol, for user plane traffic, wherein the first user plane of the first relay node equipment and the second user plane of the second relay node equipment establish a multi-hop architecture between the first relay node equipment and the second relay node equipment in the integrated access and backhaul network, wherein the first user plane is separated from, and operates independently of, the first control plane, wherein the second connection is configured for a secondary cell group, wherein the first connection and the second connection are separate connections, and wherein a first handover of the first relay node equipment does not trigger a second handover of a child node of the first relay node equipment based on the star-type architecture.

16. The non-transitory machine-readable medium of claim 15, wherein the operations further comprise:

implementing a control plane procedure based on using the first connection for a master cell group bearer of the first relay node equipment.

17. The non-transitory machine-readable medium of claim 15, wherein the operations further comprise:
carrying backhaul traffic over the second connection, wherein the backhaul traffic is carried on a secondary cell group bearer for the first relay node equipment and the second relay node equipment.

18. The non-transitory machine-readable medium of claim 15, wherein the master cell group comprises the donor node equipment, wherein the secondary cell group comprises the child node, and wherein the child node is a relay node at a lower hop order as compared to the first relay node equipment.

19. The non-transitory machine-readable medium of claim 15, wherein the operations further comprise:
transmitting secondary cell group reconfiguration signaling via the second connection.

20. The non-transitory machine-readable medium of claim 15, wherein the operations further comprise:
implementing a control plane procedure based on using the first connection for a master cell group bearer of the first relay node equipment.

* * * * *